Sept. 18, 1923.  
J. GUTTENSTEIN ET AL  
1,468,615  
HEATING ATTACHMENT FOR CAKE MIXERS  
Filed May 18, 1923   2 Sheets-Sheet 2
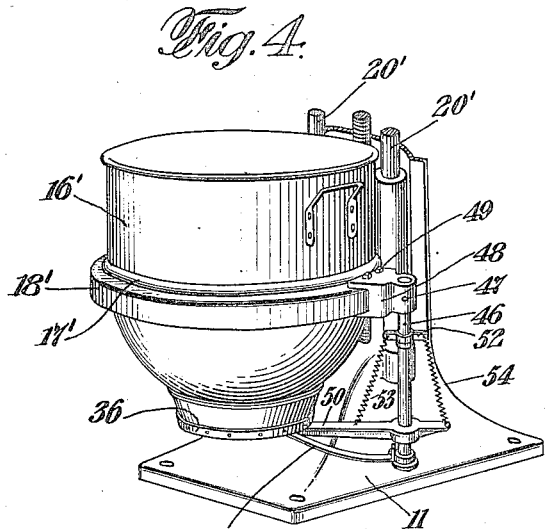
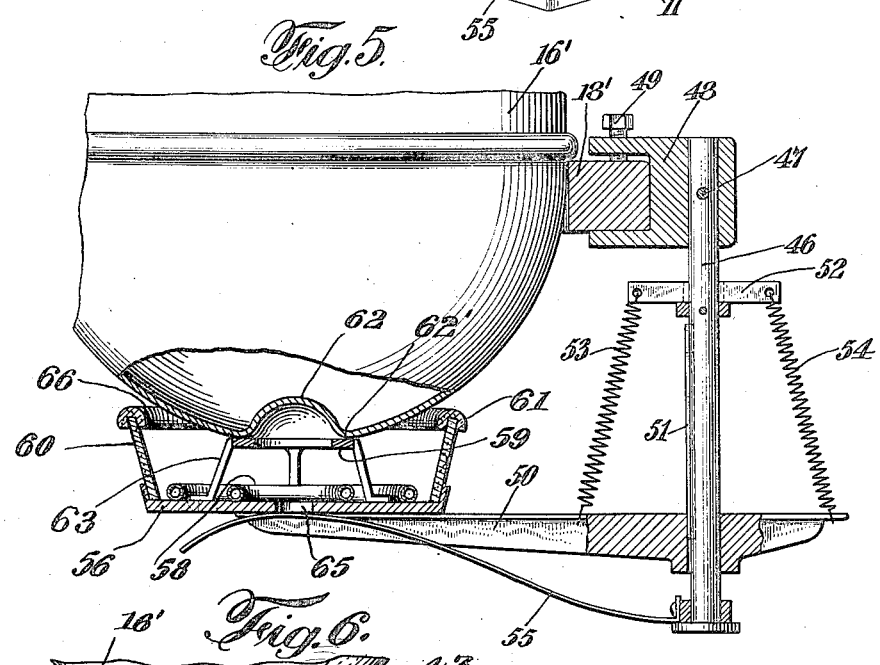
Inventors  
Joseph Guttenstein  
Isidor Kritzer  
By their Attorneys  
Dean, Fairbank, Obright & Hirsch Patented Sept. 18, 1923.

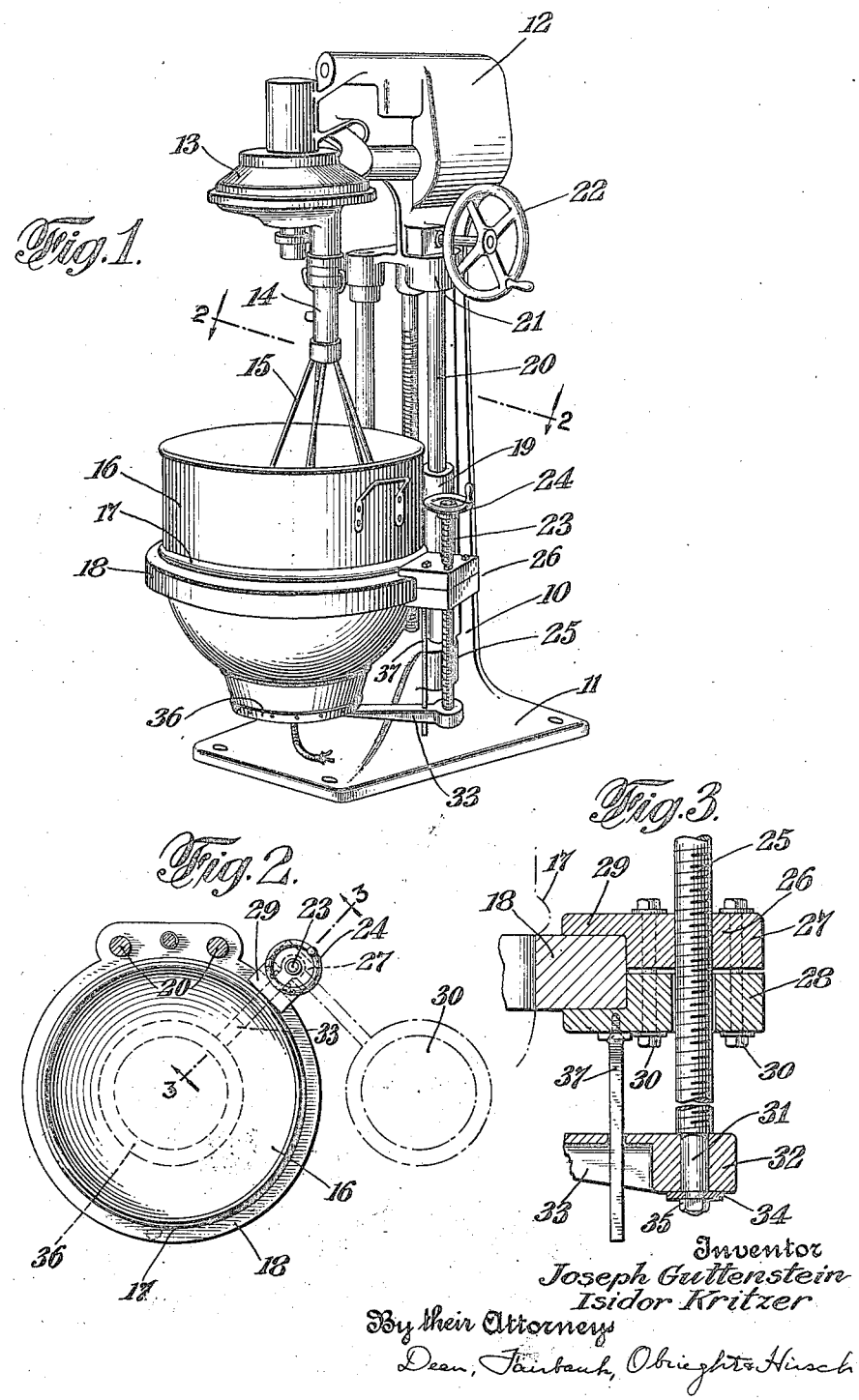

1,468,615

UNITED STATES PATENT OFFICE.

JOSEPH GUTTENSTEIN AND ISIDOR KRITZER, OF NEW YORK, N. Y.

HEATING ATTACHMENT FOR CAKE MIXERS.

Application filed May 18, 1923. Serial No. 639,780.

*To all whom it may concern:*

Be it known that we, JOSEPH GUTTENSTEIN and ISIDOR KRITZER, citizens of the United States, and residents of New York city, in the county of New York and State of New York, have invented certain new and useful Improvements in Heating Attachments for Cake Mixers, of which the following is a specification.

Our present invention is mainly concerned with the improvement of well known types of mechanical cake mixing apparatus, and its primary, though not its only purpose, is to expedite the mixing of batters composed largely of eggs and sugar.

As conducive to a clear understanding of the invention, it may be noted that it takes relatively long to beat a cold mixture of eggs and sugar to proper consistency. Small bakers and restaurateurs are greatly inconvenienced by the substantial delay incurred, while the machine is used for making an egg and sugar batter during which time the apparatus cannot be used for any of the numerous other purposes, such as mixing dough, whipping cream, crushing fruits, mashing potatoes, for which it is intended. Moreover, much electric power is consumed in the egg beating operation and the consistency of the ultimate product is not always entirely satisfactory.

Where the mixture is previously heated, it may cool rapidly before the mechanical beating operation can be completed, so that preheating does not shorten the beating period very much. Preheating is, moreover, disadvantageous in that the time and attention of a skilled person would be required to avoid scorching.

Our invention has among its objects to render possible the satisfactory mixing of egg and sugar or similar batters in a short period, in the order of a few minutes, without involving any preheating operation and without the likelihood of scorching the batter.

Another object is to provide means for maintaining the mixture at desired temperature, which means shall be easily adaptable for coaction with any of the interchangeable bowls of assorted sizes commonly used with ordinary cake mixing machines.

Among other objects of the invention are to provide a simple attachment for accomplishing the foregoing results, readily applied to standard cake mixing machines in common use, which shall not interfere in any way with the use of the machine for any of the other purposes, for which it is intended.

In a preferred embodiment, an appropriate electric heater is mounted below the bowl support and coaxially thereof, and is adjustable for proper coaction with the wall of a mixing bowl of any of the assorted sizes used with the mixer. Preferably the adjustment consists in changing the elevation of the electric heater, which is provided preferably with stop means such as an upstanding heat insulating flange, the rim of which is to engage the bottom of the bowl. Means may also be provided to permit displacement of the heater to inobtrusive position, without removal from the machine, so as not to interfere with the use of a collecting pan or other accessory device to be placed below the mixing bowl for crumbing and other operations.

In another preferred embodiment, a fuel burning heater is substituted for the electric heater, and preferably includes an annular stop which impinges against the rim of the usual cavity of uniform diameter in the bottoms of mixing bowls of various sizes and protects the same against sooting, while serving to space the burners at desired distance from the bowl.

In one embodiment, the position of the heater whether of the electric or fuel burning type is adjusted by manual operation as by a readily accessible hand wheel, operating a supporting rod for the heater. In another embodiment, the heater is automatically urged upward as by a spring, so that upon placing any size of bowl upon the support ring, the bowl will depress the heater for proper coaction therewith.

In the accompanying drawings in which are shown one or more of the various possible embodiments of the several features of this invention, Fig. 1 is a perspective view of one form of the invention.

Fig. 2 is a sectional view taken along the line 2—2 of Fig. 1,

Fig. 3 is a sectional view on an enlarged scale taken along the line 3—3 of Fig. 3, Fig. 4 is a fragmentary view similar to Fig. 1 of a modification, Fig. 5 is a sectional view on an enlarged scale showing the positioning means for the heater, and Fig. 6 is a fragmentary view on a smaller scale similar to Fig. 5 of another embodiment.

In Figs. 1, 2 and 3 of the drawings is shown the general outline of a known type of a so-called cake mixer used by bakers and restaurateurs, for mixing cake, beating eggs, whipping cream, crushing fruits, mashing potatoes, crumbing bread and for performing other mechanical operations. The machine includes a heavy standard 10 having a base 11 and at its upper end, an integral casing portion 12 enclosing a driving motor (not shown) and a contiguous casing portion 13 enclosing planetary gearing (not shown) for operating a shaft 14 to impart to the latter, a combined rotary and planetary motion. The shaft 14 carries a beater structure 15 extending into the mixing bowl 16, the latter having a bead 17 resting on supporting ring 18 through which the bottom of the bowl extends. Mixing machines of the type shown are ordinarily equipped with three or more interchangeable bowls of assorted sizes, one or more special removable bowl rings (not shown) being used to fit into the support ring to adapt the latter for mounting the smaller bowls. To dispose a bowl of any of the various sizes used, for proper correlation with the beater, so that the latter extends to near the bottom of the bowl in every case, the level of the supporting ring is adjustable. In the embodiment shown, the supporting ring is formed with a sleeve 19 rigid therewith, encircling vertical rod 20, mounted in bearings 21 in the frame and operable by a hand wheel 22, through appropriate worm gearing (not shown). By the rotation of the hand wheel, the supporting ring and with it the bowl may be raised, so that the beater will extend in every case in proper position to near the bottom of the bowl, for most effective beating operation. The cake mixer need not be described in greater detail as the construction is well known and taken by itself is not our invention.

In one embodiment of our invention, an electric heating attachment coacts with the bowl for the purpose of maintaining the batter at appropriate temperature. The attachment includes a vertical rod 23 provided with a hand-wheel 24 at its upper end, threaded substantially the length thereof as at 25 and having a threaded fit in a bearing member 26 comprising a pair of plates 27 and 28 forming jaws 29 clamped to the supporting ring 18 by bolts 30 through said plates. Surrounding the reduced unthreaded lower end 31 of the rod 20 is an eye 32 at the end of a horizontal arm 33 held in position by a washer 34 and nut 35 at the extreme lower end of the rod, said arm carrying an appropriate electric heater 36 at its free or outer end. A pin, yoke or other suitable element 37 is secured into the lower of the clamp jaws 28 and extends downward therefrom, preferably through a corresponding aperture 38 in arm 33, to serve as a guide therefor to maintain the arm against lateral displacement about the rod 23 as an axis, so as to maintain the heater in coaxial alignment with the supporting ring 18 and the bowl 16 mounted thereon.

The heater (see Figs. 2 and 6) comprises a disk 39 of heat insulating material, having mounted thereon, an appropriate electric heating coil 40, the specific details of which are not material to our invention, the disk support being preferably surrounded by an outwardly flaring flange 41 of heat resisting material, such as asbestos-fibre, which may be appropriately reinforced mechanically, as by a metal enclosing shell 42. The rim may at its edge be provided with a cushioning ring 43 of asbestos or the like for engagement with the bowl. Preferably the electrical connection to the heater is effected by a conduit 44 with an appropriate plug (not shown) connected to the same source of current, from which the electric driving motor is operated.

For use, the batter is placed in the bowl 16 and the latter mounted upon its support ring. Thereupon, the hand wheel 22 is rotated to elevate the supporting ring 18 together with the bowl 16, to correctly place the bottom of the latter, regardless what its size, relative to the beater. In this operation, the entire heater attachment device rises as a unit with the support ring and bowl. The hand wheel 24 is now rotated to elevate the rod 23 and with it the arm 33 and heater 36 preferably until the yielding cushion rim 43 engages the bottom of the particular bowl used, as shown in Fig. 1. The switches (not shown) of the driving motor as well as of the electric heater should now be closed, although, if desired the heater may be energized first for a short interval before energizing the motor. The heating coil maintaining the batter within a proper range of temperature, the mechanical operation is completed within a few minutes. Power is thus used for but a relatively short interval and is, moreover, efficiently applied, the disk base 39 and the flange enclosure 41 constituting a substantially heat-proof enclosure for the coil 40, avoiding loss by radiation, which would add to the discomfort of the usually hot bake shop. As the batter is being continually stirred quite vigorously while it is heated, there is no likelihood of sticking or scorching.

After the heating operation is completed, the heater may be disposed in inobstrusive position, so as not to interfere with crumbing or other operations, which necessitate the disposal of a pan or other device upon the base 11 of the standard below the mixing bowl. For this purpose, the pin 37 is formed of such length only that when the arm is depressed to near the extremity, its aperture 38 will clear said pin, so that said arm together with the heater mounted thereon may be rotated as a unit about the support rod 23 as an axis, as best shown in Fig. 2 to clear the supporting base 11, and may subsequently be as readily returned to operative position for further use, without the possibility of mislaying and without taking up extra room, as where a separate, or distinct heater removable from the device is employed.

In Figs. 4 and 5 is shown an alternative embodiment of the invention, similar parts of the mixer bearing the same reference numerals as in Figs. 1 to 3, primed. The heater attachment includes means for automatically disposing the heater into proper correlation with respect to bowls of different sizes. For this purpose, we provide a vertical unthreaded support rod 46 pinned as at 47 to an appropriate yoke or collar 48 which is clamped by screw 49 to the supporting ring 18' for the bowl 16'. If desired, the lower end of rod 46 may also be secured to the base 11'. The heater 36 to be described below is mounted on a horizontal arm 50 similar to that in the other embodiment. The arm 50, however, is not movable with the rod as in Figs. 1, 2 and 3, but is keyed thereto as at 51 for translation therealong. Preferably a cross-bar 52 fixed to rod 46 is connected to the heater support arm 50 by a pair of symmetrically disposed coil springs 53 and 54, which tend to urge the arm 50 and with it the heater upward to a limiting position. The weight of the heater unit and of the projecting part of arm 50 which might tend to unbalance the structure are compensated for preferably by a leaf spring 55 secured near the bottom of the rod 51, and pressing upward at the center of the heater 36. It will be seen that the heater 36 is normally located at the upper extreme position to which the springs 53, 54 and 55 urge it. Upon inserting the bowl 16' through the support ring 18', it first engages the stop on the heater to be described below and automatically depresses the latter, overcoming the resistance of springs 53, 54 and 55, until the bowl bead 17' rests on the ring 18', the heater rim remaining in contact with the bottom of the bowl, as shown in the drawings. By this embodiment, the need for any special manual adjusting operation of the heater is thus obviated.

The key 51 on the rod 46 preferably terminates somewhat above the bottom of the rod, so that upon depression of the heater support arm 50 to the limit, the key connection will be interrupted and the arm can be rotated about the rod as an axis to dispose both the arm and heater in inobtrusive position for permitting the use of a crumb collecting pan or other device. The key 51 on the rod coacts with the arm 50, to maintain the heater in the lowermost position, and the springs 53, 54 and 55 in stressed condition, while the heater is out of use. In return of the heater to operative position, as the key slot in the arm becomes aligned with the key on the support rod 46, the springs by their return action, automatically elevate the heater to its uppermost position for operation in accordance with the foregoing description.

It will be seen that we have provided a heater attachment, which is easily applied without modification of the standard construction of the cake mixer, and which is readily set for proper coaction with any of the assortment of bowls used, and which is easily placed in inobtrusive position, when some other device is to be placed upon the standard base.

The heater illustratively shown in Fig. 5 is an embodiment utilizing a fuel, preferably one to be operated by ordinary illuminating gas. The heater preferably comprises a disk bottom 56 resting upon the arm 57 corresponding to either arm 33 or 50, in Figs. 1 and 5 respectively, and has a series of gas jets 58 thereon, supplied through gas cocks (not shown). Any suitable arrangement may be provided for operating a greater or lesser number of the gas jets depending on the size of the bowl or volume of the mass to be mixed or beaten and, of course, the size of the flame is adjustable in the usual manner. The heater may also have a protective flange 60 and a rim 61.

A stop preferably a metallic annulus 59, fixedly secured and supported by a spider 63 upon the base 56, serves by contact with the mixing bowl $16^1$ to space the burner at appropriate distance from the bottom of the bowl. The various mixing bowls of assorted sizes used with the various types of cake mixers, are commonly provided with central convexities 62 in their bottoms, pressed upward from the underside of the vessel, and all of uniform diameter regardless what the size of the bowl, the beater 15 traveling in its planetary movement about the convexity. Preferably the annulus 59 is made of substantially the diameter of the rim 62' of the convexity 62. Regardless what the size of the bowl used, it follows that annulus 59 will cover and protect the rim 62' thereof, when brought into engagement therewith in use. Any soot or carbon resulting from eventual incomplete combustion in the gas flame, may, therefore, deposit on the wall of the vessel, but not on the rim 62', upon which the mixing bowl rests when placed on a table for subsequent operations after removal from the machine. Thus, even though carbon is deposited on the bowl, the part rested on the table remains clean and the table will not be soiled.

Thus the annulus 59 acts as a stop to arrest the heater when it is in proper position relative to the mixing bowl and, moreover, as a guard or shield to prevent carbon deposit at the part of the bowl, subsequently rested upon the table. The bottom 56 of the heater is preferably provided with an aperture 65 which may be at the center, and as shown, the rim 61 is of diameter such as to leave a substantial clearance 66 with respect to the wall of the mixing bowl, regardless of the diameter of the latter. It follows that in operation, ample air will enter at the bottom and escape through the gap 66 providing the oxygen needed for combustion.

It will, of course, be understood that other forms of heater coacting with the sides rather than the body of the vessel may be employed, and that the electric and fuel heaters may be substituted for each other in the alternative embodiments of cake mixers shown in the drawings.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described our invention, what we claim as new and desire to secure by Letters Patent of the United States is:—

1. In a cake mixer of the type comprising a frame, a bowl support ring and a motor driven beater to extend into a bowl removably supported on the ring; the combination therewith of a heater disposed below the ring for heating a batch within the bowl mounted on the support, releasable means for securely retaining said heater in position coaxial of said ring, and guide means determining the path of displacement of said heater to inobtrusive position to permit placing of a collecting pan below the bowl.

2. In a cake mixture of the type comprising a frame, a bowl support ring and a motor driven beater to extend into a bowl removably supported on the ring; the combination therewith of a heater disposed below the ring and coaxially thereof, for heating a batch within the bowl mounted on the ring, a pivotal mount for said heater laterally thereof, releasable means for restraining said mount against pivotal displacement to maintain said heater in position coaxial of said ring, whereby upon release of said restraining means said heater may be displaced about said mount as an axis to dispose it in inobtrusive position in order to permit the disposal of a collecting pan below the bowl.

3. In a cake mixer of the type comprising a frame, a bowl support ring and a motor driven beater to extend into a bowl removably supported on the ring; the combination therewith of a heating attachment including a vertical rod, a lateral arm protruding therefrom, a heater mounted on said arm and substantially coaxial with said ring, means for raising said arm with said heater to desired elevation with respect to a bowl of any size, said arm with said heater being rotatable about said rod at one elevation to dispose the heater to inobtrusive position in order to make room for a collecting pan, and means operative at other elevations for restraining said arm against displacement from axial alignment of the heater with the bowl.

4. In a cake mixer of the type comprising a frame, a bowl support ring and a motor driven beater to extend into a bowl removably supported on the ring; the combination therewith of a heater attachment including an upstanding circular flange or rim, means for elevating said heater for engagement of the flange rim thereof with the bottom of a bowl of substantially any size, and means guiding said flange for movement coaxially of said ring throughout the range of elevation thereof, said means being effective at the lowermost elevation of the heater to permit displacement of said heater to inobtrusive position out of axial alignment with the bowl and without removal of the attachment.

5. In a cake mixing machine, in combination, a frame, a driving motor at the upper end thereof, a beater extending downward therefrom, a supporting ring, a manually operable means for adjusting the elevation of said ring to properly correlate a bowl of any size with the beater, a heater supported from said adjustable ring and movable therewith, and separate means for adjusting the position of the heater relative to said ring for correct coaction of the heater with a bowl of any size.

6. The combination set forth in claim 5 in which means is provided to confine the movement of adjustment of said heater to substantially a vertical path, and in which at one extremity of the displacement the heater is free to be disposed to inobtrusive position to make room for a collecting pan.

7. In a cake mixing machine, in combination, a bowl support, a heater mounted below said support and coaxial therewith, said heater including means to contact the bottom of a bowl carried by the support, and yielding mounting means for said heater, whereby said heater will upon application of a bowl of any size automatically adapt itself to position for proper correlation therewith.

8. In a cake mixer, in combination, a supporting ring, a heater unit coaxial with and below said ring, spring means urging said heater upward, said heater including an upstanding rim, whereby upon positioning a bowl of any size in the support ring, the bowl will contact said rim and will depress the heater against the resistance of the spring means to proper relative position.

9. In a cake mixer of the type comprising a frame, a bowl support ring and a motor driven beater to extend into a bowl removably supported on the ring; the combination therewith of a heating attachment comprising a vertical guide rod fixed to said standard laterally of the support ring, a horizontal arm keyed with respect to said rod for longitudinal displacement therealong, a heater unit mounted near the outer end of said arm and below said support ring and coaxial thereof, and spring means urging said heater unit upward, said heater including upstanding stop means to engage the bowl, whereby upon insertion of a bowl of any of the various sizes to be fitted into the ring, the heater will be depressed with its supporting arm to the appropriate elevation for coaction therewith.

10. The combination set forth in claim 9 in which the keyed connection terminates at one extremity of displacement of the arm to permit rotation of the arm about the support rod as an axis and consequent displacement of the heater to inobtrusive position.

11. The combination set forth in claim 9 in which a pair of coil springs symmetrically disposed with respect to the support rod urge the arm upward and in which a leaf spring coacts with the bottom of the heater to urge it upward for balancing the asymmetrical strain on the two coil springs.

12. In a cake mixer, in combination, a bowl support, a fuel burning heater, and means for adjusting the position of said heater to properly correlate it with respect to bowls of different sizes, said heater including stop means to contact the bowl when the parts are correctly correlated, said stop means affording a space between the jets and the bowl to allow access of oxygen to the flame.

13. In a cake mixer, in combination, a bowl support, a fuel burning heater, said heater including stop means to engage the annular base of conventional bowls, and means for adjusting the position of the heater to bring the stop means into coaction with the bowl and affording space between the heater and the bowl for access of air and escape of products of combustion.

14. In a cake mixer, in combination, a bowl support, a fuel burning heater unit, said heater unit including an annular combined rest and guard portion of the uniform diameter of the annular support of conventional mixing bowls of assorted sizes, and means for adjusting the position of said heater to cause the annular combined stop and guard to engage the bowl.

15. In a cake mixer, in combination, a bowl support, a fuel burning heater, said heater including an annular base, fuel burning jets carried thereon, said unit including a spider, an annulus carried by said spider and of diameter for superposition thereover of the uniform supporting base of conventional mixing bowls of assorted sizes, and means for adjusting the position of said heater to cause the annulus to engage the mixing bowl, whereby the heater will be disposed at proper distance from the base of the mixing bowl, and whereby the bottom of the bowl will be protected against carbon deposit, so that upon placing of the bowl, after operation, upon a table or support, sooting thereof will be avoided.

Signed at New York city, in the county of New York and State of New York, this 14th day of May, 1923.

JOSEPH GUTTENSTEIN.
ISIDOR KRITZER.